US009043370B2

(12) United States Patent
Hopmann et al.

(10) Patent No.: US 9,043,370 B2
(45) Date of Patent: *May 26, 2015

(54) ONLINE DATABASE AVAILABILITY DURING UPGRADE

(71) Applicant: Microsoft Corporation, Redmond, WA (US)

(72) Inventors: Alexander Hopmann, Seattle, WA (US); Balinder Malhi, Redmond, WA (US); Zach Rosenfield, Seattle, WA (US); Marc Windle, Abbotsford (CA); Erick Raymundo Lerma, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/858,630

(22) Filed: Apr. 8, 2013

(65) Prior Publication Data
US 2013/0226973 A1 Aug. 29, 2013

Related U.S. Application Data

(63) Continuation of application No. 12/908,703, filed on Oct. 20, 2010, now Pat. No. 8,417,737.

(51) Int. Cl.
G06F 17/30 (2006.01)
(52) U.S. Cl.
CPC .... G06F 17/30292 (2013.01); G06F 17/30297 (2013.01); G06F 17/30893 (2013.01)
(58) Field of Classification Search
USPC ............... 707/101, 102, 634, 803; 348/14.01; 709/204–206
See application file for complete search history.

(56) References Cited

U.S. PATENT DOCUMENTS

| | | | |
|---|---|---|---|
| 5,553,215 A | | 9/1996 | Kaethler .................... 715/219 |
| 5,835,910 A | * | 11/1998 | Kavanagh et al. ................. 1/1 |
| 5,857,211 A | | 1/1999 | Carper et al. |
| 5,913,032 A | | 6/1999 | Schwartz et al. ............. 709/213 |

(Continued)

FOREIGN PATENT DOCUMENTS

| | | |
|---|---|---|
| CN | 1908934 A | 2/2007 |
| CN | 1989489 | 6/2007 |

(Continued)

OTHER PUBLICATIONS

Chinese Notice on Grant dated Feb. 10, 2014 cited in 201110339894. 3, 4 pgs.

(Continued)

Primary Examiner — Etienne Leroux
(74) Attorney, Agent, or Firm — Tom Wong; Jim Ross; Micky Minhas

(57) ABSTRACT

An online service includes databases that are upgraded while still processing requests. For example, web servers continue to request operations on the database while it is being upgraded. The schema of the database is upgraded before the web servers are upgraded to utilize the upgraded schema. Changes that are made to the upgraded schema are backwards compatible with the schema being used during the upgrade process. Restrictions are placed on the operations performed on the database during the upgrade process. After upgrading the schema, the web servers of the online service are upgraded to use the upgraded schema.

20 Claims, 7 Drawing Sheets

(56) References Cited

U.S. PATENT DOCUMENTS

| | | | |
|---|---|---|---|
| 5,983,268 A | 11/1999 | Freivald et al. | |
| 6,157,934 A | 12/2000 | Khan et al. | |
| 6,212,382 B1 | 4/2001 | Watson et al. | 455/444 |
| 6,243,824 B1 | 6/2001 | Kakuta et al. | |
| 6,453,325 B1 | 9/2002 | Cabrera et al. | |
| 6,571,283 B1 | 5/2003 | Smorodinsky | 709/220 |
| 6,572,662 B2 | 6/2003 | Manohar et al. | |
| 6,578,054 B1 | 6/2003 | Hopmann et al. | 707/625 |
| 6,613,098 B1 | 9/2003 | Sorge et al. | |
| 6,654,746 B1 | 11/2003 | Wong et al. | |
| 6,675,226 B1 | 1/2004 | Nair et al. | |
| 6,711,593 B1 | 3/2004 | Gordon et al. | 707/615 |
| 6,738,799 B2 | 5/2004 | Dickenson | |
| 6,823,384 B1 | 11/2004 | Wilson et al. | 709/225 |
| 6,898,727 B1 | 5/2005 | Wang et al. | |
| 6,912,690 B2 | 6/2005 | Bauchot | |
| 6,934,848 B1 | 8/2005 | King et al. | |
| 6,983,311 B1 | 1/2006 | Haitsuka et al. | |
| 6,988,241 B1 | 1/2006 | Guttman et al. | |
| 7,000,228 B2 | 2/2006 | Mortazavi | 717/168 |
| 7,035,926 B1 | 4/2006 | Cohen et al. | |
| 7,047,484 B1 | 5/2006 | Becker et al. | |
| 7,200,804 B1 | 4/2007 | Khavari et al. | |
| 7,251,776 B2 | 7/2007 | Handsaker et al. | |
| 7,325,156 B1 | 1/2008 | Schloss et al. | |
| 7,360,208 B2 | 4/2008 | Joshi et al. | 717/168 |
| 7,454,471 B2 | 11/2008 | Sorge et al. | |
| 7,454,659 B1 | 11/2008 | Gaudette et al. | |
| 7,463,648 B1 | 12/2008 | Eppstein et al. | |
| 7,516,367 B1 | 4/2009 | Beltowski et al. | |
| 7,555,751 B1 | 6/2009 | Abbavaram et al. | 717/168 |
| 7,577,661 B2 | 8/2009 | Bankston et al. | 1/1 |
| 7,668,961 B2 | 2/2010 | Lomet | 709/230 |
| 7,680,848 B2 | 3/2010 | Janeditakarn | |
| 7,680,933 B2 | 3/2010 | Fatula, Jr. | 709/226 |
| 7,720,820 B2 | 5/2010 | Lomet | 707/682 |
| 7,823,145 B1 | 10/2010 | Le et al. | |
| 7,840,911 B2 | 11/2010 | Milener et al. | |
| 8,103,906 B1 | 1/2012 | Alibakhsh et al. | |
| 8,108,779 B1 | 1/2012 | Rein et al. | |
| 8,185,897 B2 | 5/2012 | Kushwaha | |
| 8,190,987 B2 | 5/2012 | Campbell et al. | |
| 8,250,170 B2 | 8/2012 | Stuckman et al. | |
| 8,296,267 B2 | 10/2012 | Cahill et al. | |
| 8,307,119 B2 | 11/2012 | Rochelle et al. | |
| 8,386,501 B2 | 2/2013 | Cahill et al. | |
| 8,417,737 B2 * | 4/2013 | Hopmann et al. | 707/803 |
| 8,578,399 B2 | 11/2013 | Khen et al. | |
| 8,751,656 B2 | 6/2014 | Cahill et al. | |
| 8,799,453 B2 | 8/2014 | Cahill et al. | |
| 8,850,550 B2 | 9/2014 | Dalzell et al. | |
| 2001/0056554 A1 | 12/2001 | Chrabaszcz | 714/13 |
| 2002/0010743 A1 | 1/2002 | Ryan et al. | |
| 2002/0078074 A1 | 6/2002 | Cho et al. | |
| 2002/0078233 A1 | 6/2002 | Biliris et al. | 709/238 |
| 2002/0129054 A1 | 9/2002 | Ferguson et al. | |
| 2002/0161814 A1 | 10/2002 | Wical | |
| 2002/0162049 A1 | 10/2002 | Takamoto et al. | |
| 2002/0169799 A1 | 11/2002 | Voshell | |
| 2003/0005133 A1 | 1/2003 | Banerjee et al. | |
| 2003/0061365 A1 | 3/2003 | White et al. | 709/229 |
| 2003/0126229 A1 | 7/2003 | Kantor et al. | |
| 2003/0154279 A1 | 8/2003 | Aziz | |
| 2003/0193558 A1 * | 10/2003 | Doss et al. | 348/14.01 |
| 2003/0204460 A1 | 10/2003 | Robinson et al. | |
| 2003/0221190 A1 | 11/2003 | Deshpande et al. | |
| 2004/0024881 A1 | 2/2004 | Elving et al. | |
| 2004/0111636 A1 | 6/2004 | Baffles et al. | |
| 2004/0133619 A1 | 7/2004 | Zelig et al. | 709/200 |
| 2004/0143662 A1 | 7/2004 | Poyhonen et al. | 709/225 |
| 2004/0205765 A1 | 10/2004 | Beringer et al. | |
| 2004/0210623 A1 | 10/2004 | Hydrie et al. | 709/223 |
| 2004/0237045 A1 | 11/2004 | Meltzer | |
| 2005/0044486 A1 | 2/2005 | Kotler et al. | |
| 2005/0050076 A1 | 3/2005 | Tong et al. | 707/100 |
| 2005/0132382 A1 | 6/2005 | McGuire et al. | |
| 2006/0015806 A1 | 1/2006 | Wallace | |
| 2006/0015932 A1 | 1/2006 | Ballinger et al. | 726/9 |
| 2006/0015933 A1 | 1/2006 | Ballinger et al. | |
| 2006/0031268 A1 | 2/2006 | Shutt et al. | |
| 2006/0070020 A1 | 3/2006 | Puttaswamy et al. | |
| 2006/0075076 A1 | 4/2006 | Sinha | |
| 2006/0085785 A1 | 4/2006 | Garrett | 718/1 |
| 2006/0122469 A1 | 6/2006 | Martel | |
| 2006/0123119 A1 | 6/2006 | Hill et al. | 709/227 |
| 2006/0168218 A1 | 7/2006 | Kashyap | 709/225 |
| 2006/0190698 A1 | 8/2006 | Mizuno et al. | 711/170 |
| 2006/0271395 A1 | 11/2006 | Harris et al. | 718/1 |
| 2006/0274695 A1 | 12/2006 | Krishnamurthi et al. | |
| 2006/0277224 A1 | 12/2006 | Aftab et al. | 707/201 |
| 2007/0005769 A1 | 1/2007 | Ammerlann et al. | 709/226 |
| 2007/0043860 A1 | 2/2007 | Pabari | |
| 2007/0050415 A1 | 3/2007 | Armangau et al. | |
| 2007/0086476 A1 | 4/2007 | Iglesias et al. | |
| 2007/0130566 A1 | 6/2007 | van Rietschote et al. | 718/1 |
| 2007/0169189 A1 | 7/2007 | Crespo et al. | |
| 2007/0198554 A1 | 8/2007 | Liu | 1/1 |
| 2007/0204325 A1 | 8/2007 | Cameron et al. | |
| 2007/0214455 A1 | 9/2007 | Williams et al. | |
| 2007/0219956 A1 | 9/2007 | Milton | 1/1 |
| 2007/0220415 A1 | 9/2007 | Cheng et al. | |
| 2007/0240161 A1 | 10/2007 | Prabhakar et al. | |
| 2007/0245235 A1 | 10/2007 | Singh et al. | |
| 2007/0260644 A1 | 11/2007 | Ljungqvist et al. | |
| 2007/0261049 A1 | 11/2007 | Bankston et al. | 717/170 |
| 2007/0271560 A1 | 11/2007 | Wahlert et al. | |
| 2007/0285501 A1 | 12/2007 | Yim | |
| 2008/0065674 A1 * | 3/2008 | Liu et al. | 707/102 |
| 2008/0077632 A1 | 3/2008 | Tysowski et al. | |
| 2008/0082560 A1 * | 4/2008 | Agrawal et al. | 707/101 |
| 2008/0098046 A1 | 4/2008 | Alpern et al. | 1/1 |
| 2008/0120351 A1 | 5/2008 | Khaladkar et al. | |
| 2008/0126428 A1 | 5/2008 | Swanburg | |
| 2008/0147753 A1 | 6/2008 | Chasman et al. | 1/1 |
| 2008/0154918 A1 | 6/2008 | Iwatsu et al. | |
| 2008/0155023 A1 | 6/2008 | Kadashevich | |
| 2008/0189468 A1 | 8/2008 | Schmidt et al. | 711/6 |
| 2008/0243763 A1 | 10/2008 | Bishop et al. | |
| 2008/0243867 A1 | 10/2008 | Janedittakarn et al. | 1/1 |
| 2008/0244184 A1 | 10/2008 | Lewis et al. | 711/130 |
| 2008/0256607 A1 | 10/2008 | Janedittakarn | |
| 2008/0263534 A1 | 10/2008 | Hirsave et al. | |
| 2008/0270459 A1 | 10/2008 | Grewal et al. | 1/1 |
| 2008/0270564 A1 | 10/2008 | Rangegowda et al. | 709/212 |
| 2008/0270706 A1 | 10/2008 | Fair et al. | |
| 2008/0289020 A1 | 11/2008 | Cameron et al. | |
| 2009/0018999 A1 | 1/2009 | Petri | |
| 2009/0049056 A1 | 2/2009 | Shutt et al. | |
| 2009/0083561 A1 | 3/2009 | Kaburlasos et al. | 713/323 |
| 2009/0100419 A1 | 4/2009 | Childress et al. | |
| 2009/0113442 A1 | 4/2009 | Deidda et al. | |
| 2009/0164621 A1 | 6/2009 | Kothari et al. | 709/224 |
| 2009/0199177 A1 | 8/2009 | Edwards et al. | |
| 2009/0216789 A1 * | 8/2009 | Chowdhary et al. | 707/101 |
| 2009/0216855 A1 | 8/2009 | Lang et al. | |
| 2009/0216975 A1 | 8/2009 | Halperin et al. | |
| 2009/0228589 A1 | 9/2009 | Korupolu | |
| 2009/0228950 A1 | 9/2009 | Reed et al. | 726/1 |
| 2009/0248756 A1 | 10/2009 | Akidau et al. | |
| 2009/0293022 A1 | 11/2009 | Fries | 716/132 |
| 2009/0293056 A1 | 11/2009 | Ferris | |
| 2009/0327139 A1 | 12/2009 | Shah et al. | 705/71 |
| 2010/0011409 A1 | 1/2010 | Hodgkinson et al. | 726/1 |
| 2010/0027552 A1 | 2/2010 | Hill | |
| 2010/0058349 A1 | 3/2010 | Diwakar et al. | |
| 2010/0070466 A1 | 3/2010 | Prahlad et al. | |
| 2010/0077165 A1 | 3/2010 | Lu et al. | |
| 2010/0082860 A1 | 4/2010 | Murthy | |
| 2010/0083253 A1 | 4/2010 | Kushwaha | |
| 2010/0095198 A1 | 4/2010 | Bultrowicz et al. | |
| 2010/0106812 A1 | 4/2010 | Bernabeu-Auban et al. | 709/221 |
| 2010/0113159 A1 | 5/2010 | Chapman et al. | |
| 2010/0121902 A1 | 5/2010 | Chandrasekhar et al. | |
| 2010/0125612 A1 | 5/2010 | Amradkar et al. | 707/802 |

(56) References Cited

U.S. PATENT DOCUMENTS

| | | |
|---|---|---|
| 2010/0145861 A1 | 6/2010 | Law et al. |
| 2010/0146290 A1 | 6/2010 | Bachmann et al. ............ 713/185 |
| 2010/0162226 A1 | 6/2010 | Borissov ........................ 717/173 |
| 2010/0192143 A1 | 7/2010 | Ingle et al. ..................... 717/172 |
| 2010/0205227 A1 | 8/2010 | Weissman et al. |
| 2010/0211548 A1 | 8/2010 | Ott et al. ........................ 707/655 |
| 2010/0211619 A1 | 8/2010 | Weissman et al. |
| 2010/0251242 A1 | 9/2010 | Sivasubramanian et al. |
| 2010/0251339 A1 | 9/2010 | McAlister |
| 2010/0262632 A1 | 10/2010 | Jain |
| 2010/0275222 A1 | 10/2010 | Wallace |
| 2010/0287359 A1 | 11/2010 | Norden ......................... 712/210 |
| 2010/0312810 A1 | 12/2010 | Horton et al. |
| 2011/0022642 A1 | 1/2011 | deMilo et al. |
| 2011/0071856 A1 | 3/2011 | Nasenbenny et al. |
| 2011/0072486 A1 | 3/2011 | Hader et al. |
| 2011/0078113 A1* | 3/2011 | Franz ............................ 707/634 |
| 2011/0138391 A1 | 6/2011 | Cho et al. |
| 2011/0161964 A1 | 6/2011 | Piazza et al. |
| 2012/0101983 A1 | 4/2012 | Hopmann et al. |
| 2012/0101998 A1 | 4/2012 | Cahill et al. |
| 2012/0102067 A1 | 4/2012 | Cahill et al. |
| 2012/0102198 A1 | 4/2012 | Cahill et al. |
| 2012/0102199 A1 | 4/2012 | Hopmann et al. |
| 2012/0102480 A1 | 4/2012 | Hopmann et al. |
| 2012/0102494 A1 | 4/2012 | Cahill et al. |
| 2012/0102506 A1 | 4/2012 | Hopmann et al. |
| 2012/0131660 A1 | 5/2012 | Dalzell et al. |
| 2012/0151378 A1 | 6/2012 | Parish et al. |
| 2013/0159344 A1 | 6/2013 | Cahill et al. |
| 2014/0033009 A1 | 1/2014 | Rein et al. |
| 2014/0337502 A1 | 11/2014 | Cahill et al. |

FOREIGN PATENT DOCUMENTS

| | | |
|---|---|---|
| CN | 101162988 A | 4/2008 |
| CN | 101410774 | 4/2009 |
| CN | 101657804 | 2/2010 |
| CN | 201110338943 | 10/2011 |
| KR | 10-0980599 | 9/2010 |
| SG | 189412 | 6/2014 |
| SG | 189417 | 6/2014 |
| WO | WO 2010-090899 | 8/2010 |

OTHER PUBLICATIONS

Chinese Second Office Action dated Mar. 27, 2014 cited in Appln No. 201110340491.0, 6 pgs.
Chinese Notice on Grant dated May 26, 2014 cited in 201110033912.8, 3 pgs.
Chinese Second Office Action dated May 26, 2014 cited in Appln No. 201110339964.5, 6 pgs.
Chinese Second Office Action dated Jun. 3, 2014 cited in Appln No. 201110339864.2, 11 pgs.
Chinese Second Office Action dated Jun. 11, 2014 cited in Appln No. 201110340455.4, 6 pgs.
Chinese Third Office Action dated Jun. 25, 2014 cited in Appln No. 201110340491.0, 12 pgs.
Chinese Notice on Grant dated Jul. 3, 2014 cited in 201110340105.8, 4 pgs.
Chinese Second Office Action dated Jul. 11, 2014 cited in 201110430658.2, 10 pgs.
U.S. Office Action dated May 7, 2014 cited in U.S. Appl. No. 12/964,633, 11 pgs.
U.S. Office Action dated May 19, 2014 cited in U.S. Appl. No. 13/657,561, 59 pgs.
U.S. Office Action dated May 21, 2014 cited in U.S. Appl. No. 12/908,623, 20 pgs.
U.S. Appl. No. 12/908,681, filed Oct. 20, 2010 entitled "Placing Objects on Hosts Using Hard and Soft Constraints".
U.S. Appl. No. 12/908,639, filed Oct. 20, 2010 entitled "Dynamically Splitting Multi-Tenant Databases".
U.S. Appl. No. 12/908,623, filed Oct. 20, 2010 entitled "High Availability of Machines During Patching".
U.S. Appl. No. 12/908,653, filed Oct. 20, 2010 entitled "Web Service Patterns for Globally Distributed Service Fabric".
U.S. Appl. No. 12/908,590, filed Oct. 20, 2010 entitled "Machine Manager Service Fabric".
U.S. Appl. No. 12/908,703, filed Oct. 20, 2010 entitled "Online Database Availability During Upgrade".
U.S. Appl. No. 12/908,694, filed Oct. 20, 2010 entitled "Managing Networks and Machines for an Online Service".
U.S. Appl. No. 12/908,752, filed Oct. 20, 2010 entitled "Upgrade of Highly Available Farm Server Groups".
U.S. Appl. No. 13/657,561, filed Oct. 22, 2012 entitled "Upgrade of Highly Available Farm Server Groups".
U.S. Appl. No. 12/953,379, filed Nov. 23, 2010 entitled "Using Cached Security Tokens in an Online Service".
U.S. Appl. No. 12/964,633, filed Dec. 9, 2010 entitled "Codeless Sharing of Spreadsheet Objects".
International Search Report dated Mar. 6, 2012 cited in Appln No. PCT/US2011/054566.
International Search Report dated Mar. 6, 2012 cited in Appln No. PCT/US2011/055412.
International Search Report dated Mar. 26, 2012 cited in Appln No. PCT/US2011/053296.
International Search Report dated Apr. 25, 2012 cited in Appln No. PCT/US2011/054516.
International Search Report dated May 1, 2012 cited in Appln No. PCT/US2011/052175.
International Search Report dated May 3, 2012 cited in Appln No. PCT/US2011/053370.
International Search Report dated May 4, 2012 cited in Appln No. PCT/US2011/056594.
International Search Report dated May 17, 2012 cited in Appln No. PCT/US2011/054642.
International Search Report dated Jun. 15, 2012 cited in Appln No. PCT/US2011/062170.
Above the Cloud; "The Azure Fabric Controller"; Published Mar. 23, 2009; http://azure.snagy.name/blog/?p=89; 3 pgs.
"Adopting Server Virtualization for Business Continuity and Disaster Recovery"; CA ARCserve Backup and CA Xosoft Replication and High Availability Software with Hyper-V Technology—A Powerful Combination; Published 2009; 17 pgs.
Allamaraju; "Idempotency Explained"; Published Feb. 21, 2008; 5 pgs.
"BadBlue Excel Web Spreadsheet Collaboration Server 2.72b"; Published Apr. 20, 2010; http://badblue-excel-web-spreadsheet-collaboration-server.badblue.qarchive.org/; 2 pgs.
Chaisiri et al., "Optimal Virtual Machine Placement across Multiple Cloud Providers"; School of Computer Engineering, Nanyang Technological University, Singapore; 2009 IEEE; 8 pgs.
Chronic db; "Live Database Schema Updates—Zero Downtime"; Retrieved Sep. 20, 2010; http://chronicdb.com/benefits_of_chronicdb; 3 pgs.
Crets; "Idempotent Services"; Blog of Guy Crets; Jul. 9, 2008; 1 pg.
Das et al., "ElasTraS: An Elastic, Scalable, and Self Managing Transactional Database for the Cloud"; Department of Computer Science, University of California, Santa Barbara, CA; UCSB Computer Science Technical Report Apr. 2010; 14 pgs.
"Excel Services Overview (SharePoint Server 2010)"; Microsoft Corporation; Published May 12, 2010; http://technet.microsoft.com/en-us/library/ee424405.aspx; 3 pgs.
Exortech; "Zero-Downtime Database Deployment"; Published Feb. 1, 2009; http://exortech.com/blog/2009/02/01weekly-release-blog-11-zero-downtime-database-deployment; 3 pgs.
Forster et al.; "Using SAML Security Tokens with Microsoft Web Services Enhancements"; Published Apr. 29, 2008; http://www.ibm.com/developerworks/tivoli/library/t-samlwse/index.html; 23 pgs.
"HP Serviceguard Cluster Configuration for HP-UX 11i or Linux Partitioned Systems"; Apr. 2009; 13 pgs.
Hyser et al., "Autonomic Virtual Machine Placement in the Data Center"; HP Laboratories; Feb. 26, 2008; 11 pgs.

(56) References Cited

OTHER PUBLICATIONS

"IBM Director v6.2.x"; Retrieved Sep. 20, 2010; http://publib.boulder.ibm.com/infocenter/director/v6r2x/index.jsp?topic=/com.ibm.director.updates.helps.doc/fqm0_t_um_updating_systems.html; 2 pgs.

KaChing Engineering; "No Downtime Database Schema Changes"; Published Aug. 15, 2010; http://eng.kaching.com/2010/08/no-downtime-database-schema-changes.html; 4 pgs.

Kim, "Virtual Machine Placement Optimization"; Carnegie Mellon Engineering, Carnegie Institute of Technology; Retrieved Date—Aug. 26, 2010; 2 pgs.

Kumar; "Sharing and Previewing Google Docs in Socialwok: Google Data SPI"; Published Apr. 9, 2010; http://googleappsdeveloper.blogspot.com/2010/04/sharing-and-previewing-google-docs-in.html; 6 pgs.

"LinkedCells 1.8 Description"; WareSeeker.com; Published Mar. 16, 2009; http://wareseeker.com/Business-Finance/linkedcells-1.8.zip/1f2ea4b9e; 3 pgs.

Meng et al., "Improving the Scalability of Data Center Networks with Traffic-aware Virtual Machine Placement"; IBM T.J. Watson Research Center; Published May 6, 2010; 9 pgs.

"Microsoft High Availability Overview White Paper"; Published Jan. 2008; 19 pgs.

Microsoft; "Virtual Machine Manager"; Retrieved Sep. 21, 2010; http://www.microsoft.com/systemcenter/en/us/virtual-machine-manager.aspx; 2 pgs.

Microsoft Corporation; "Scaling Out SQL Server 2005"; Published Date: Apr. 2006; http://msdn.microsoft.com/en-us/library/aa479364.aspx; 15 pgs.

Microsoft Corporation; "Messaging Patterns in Service-Oriented Architecture, Part 1"; Published Apr. 2004; 10 pgs.

Microsoft TechNet; "Placing Virtual Machines on Hosts"; 2010 Microsoft Corporation; 3 pgs.

Microsoft TechNet; "Configure a Server Farm for Minimal Downtime During Software Updates (Office SharePoint Server 2007)"; Published Sep. 17, 2009; http://technet.microsoft.com/en-us/library/ee514459(office.12).aspx; 26 pgs.

Microsoft TechNet; "Configure Claims-Based Authentication Using Windows Live ID (SharePoint Server 2010)"; Published Sep. 9, 2010; http://technet.microsoft.com/en-us/library/ff973117(printer).aspx; 17 pgs.

MSDN Magazine; "Designing Services for Windows Azure"; Published Jan. 2010; 11 pgs.

"MySQL Cluster Features"; Retrieved Sep. 20, 2010; http://www.mysql.com/products/database/cluster/features.html; 5 pgs.

"The NorduGrid Grid Manager and GridFTP Server"; Published Aug. 10, 2010; http://www.nordugrid.org/documents/GM-pdf; 37 pgs.

Oracle9i Database Migration; "Compatibility and Interoperability"; Retrieved Sep. 20, 2010; http://download.oracle.com/docs/cd/A97630_01/server.920/a96530/migcompa.htm; 42 pgs.

Ranganathan; "Idempotency in Services"; Published Dec. 1, 2009; 21 pgs.

"RightGrid Basic Example"; Retrieved Sep. 24, 2010; http://support.rightscale.com/03-Tutorials/02-AWS/03-Grid_Edition/Basic_RightGrid_Example; 16 pgs.

"SAS Grid Computing"; SAS Institute; Retrieved Sep. 24, 2010; http://www.sas.com/technologies/architecture/grid/index.html; 2 pgs.

"Small to Medium Sized Data Center with Applogic Cloud"; Migrate to Cloud; Published Jul. 22, 2010; http://www.migrate2cloud.com/blog/small-to-medium-sized-date-center-with-applogic-cloud; 4 pgs.

Tarighi et al., "A New Model for Virtual Machine Migration in Virtualized Cluster Server Based on Fuzzy Decision Making"; Journal of Telecommunications, vol. 1, Issue 1, Feb. 2010; 12 pgs.

"Understanding SharePoint 2010 Claims Authentication"; Published May 27, 2010; http://blogs.msdn.com/b/russmax/archive/2010/05/27/understanding-sharepoint-2010-claims-authentication.aspx; 5 pgs.

"Using Vmware vCenter Update Manager to Keep your vSphere Hosts Up-to-Date with Patching"; Published Feb. 9, 2010; http://www.simple-talk.com/sysadmin/virtualization/using-vmware-vcenter-update-manager-to-keep-your-vsphere-hosts-up-to-date-with-patching/; 10 pgs.

Vmware; "Automating High Availability (HA) Services with Vmware HA"; Copyright Jun. 5, 2006; 15 pgs.

Vmware vSphere; "Vmware vCenter Update Manager"; Retrieved Sep. 14, 2010; 2 pgs.

"Vmware Virtual Appliances"; Published Jan. 8, 2009; http://www.petri.co.il/virtual_vmware_virtual_appliances.htm; 2 pgs.

Wang et al., "A Study and Performance Evaluation of the Multi-Tenant Data Tier Design Patterns for Service Oriented Computing", IBM China Research Lab, Beijing, China; IEEE Computer Society, 2008 IEEE; 8 pgs.

"XLCubed Web Edition"; Published 2009; http://xlcubed.com/en/web.html; 2 pgs.

"Zones Parallel Patching Feature Now Available"; Published Date Jun. 17, 2009; 1 pg.

U.S. Office Action dated Apr. 16, 2012 cited in U.S. Appl. No. 12/908,639.

U.S. Office Action dated Apr. 27, 2012 cited in U.S. Appl. No. 12/908,703.

U.S. Office Action dated Nov. 6, 2012 cited in U.S. Appl. No. 12/908,694.

U.S. Office Action dated Nov. 30, 2012 cited in U.S. Appl. No. 12/908,653.

U.S. Office Action dated Dec. 5, 2012 cited in U.S. Appl. No. 12/953,379.

Google et. al. "What is the correct syntax for import range function for the key attribute?"; http://productforums.google.com/forum/#!topic/docs/aqJAApdcr88; published Jan. 18, 2009; 3 pgs.

Stackexchange.com et. al., "How do I link a cell in Google Spreadsheets to a cell in another document?" See Google Spreadsheets function list"ImportRange".

Chinese Office Action dated Nov. 22, 2013 cited in Appln No. 201110339894.3.

Chinese Office Action dated Dec. 17, 2013 cited in Appln No. 201110430658.2.

Chinese Office Action dated Dec. 19, 2013 cited in Appln No. 201110339912.8.

Chinese Office Action dated Dec. 30, 2013 cited in Appln No. 201110339964.5.

Chinese Office Action dated Jan. 16, 2014 cited in Appln No. 201110339862.3.

U.S. Office Action dated Nov. 7, 2013 cited in U.S. Appl. No. 12/964,633.

Chinese Office Action dated Aug. 28, 2013 cited in Appln No. 201110340491.0.

Chinese Office Action dated Oct. 14, 2013 cited in Appln No. 201110339864.2.

Chinese Office Action dated Oct. 31, 2013 cited in Appln No. 201110340455.4.

U.S. Office Action dated Aug. 16, 2013 cited in U.S. Appl. No. 12/908,681.

U.S. Office Action dated Sep. 16, 2013 cited in U.S. Appl. No. 12/908,653.

U.S. Office Action dated Sep. 19, 2013 cited in U.S. Appl. No. 12/953,379.

U.S. Office Action dated Oct. 22, 2013 cited in U.S. Appl. No. 12/908,623.

U.S. Appl. No. 13/768,727, filed Feb. 15, 2013 entitled "Dynamically Splitting Multi-Tenant Databases".

Google et al., "Google Docs & Spreadsheet Tour", Feb. 2007, pp. 1-14.

U.S. Office Action dated Mar. 20, 2013 cited in U.S. Appl. No. 12/908,590.

U.S. Office Action dated Mar. 27, 2013 cited in U.S. Appl. No. 12/908,623.

U.S. Office Action dated Mar. 28, 2013 cited in U.S. Appl. No. 12/964,633.

U.S. Office Action dated May 14, 2013 cited in U.S. Appl. No. 12/908,694.

(56) References Cited

OTHER PUBLICATIONS

U.S. Office Action dated Jun. 5, 2013 cited in U.S. Appl. No. 12/953,379.
Chinese Office Action dated Jan. 24, 2014 cited in Appln No. 201110340105.8.
U.S. Office Action dated Mar. 12, 2014 cited in U.S. Appl. No. 12/908,653, 19 pgs.
U.S. Office Action dated Mar. 18, 2014 cited in U.S. Appl. No. 12/908,681, 26 pgs.
U.S. Appl. No. 14/445,572, filed Jul. 29, 2014 entitled "Managing Networks and Machines for an Online Service".
U.S. Office Action dated Aug. 4, 2014 cited in U.S. Appl. No. 13/768,727, 49 pgs.
U.S. Office Action dated Sep. 10, 2014 cited in U.S. Appl. No. 12/908,623, 26 pgs.
U.S. Office Action dated Sep. 19, 2014 cited in U.S. Appl. No. 12/964,633, 24 pgs.
Chinese Notice of Allowance dated May 26, 2014 cited in Appln No. 201110339912.8, 4 pgs.
Chinese Third Office Action dated Sep. 15, 2014 cited in Appln No. 201110340455.4, 6 pgs.
Chinese Second Office Action dated Sep. 18, 2014 cited in Appln No. 201110339862.3, 17 pgs.
EP Extended Search Report dated Nov. 14, 2014 cited in Appln No. PCT/US2011/056594, 7 pgs.
U.S. Office Action dated Nov. 14, 2014 cited in U.S. Appl. No. 12/908,681, 27 pgs.
EP Supplementary Search Report dated Dec. 2, 2014 cited in Appln No. PCT/US2011/056594, 1 pg.
Chinese Third Office Action mailed Dec. 12, 2014 in Application No. 201110339864.2, 11 pgs.
Chinese Third Office Action Issued in Patent Application No. 201110339964.5, Mailed Date: Dec. 12, 2014, 8 pgs.
Chinese Fourth Office Action dated Dec. 25, 2014 cited in Application No. 201110340491.0, 9 pgs.
Chinese Third Office Action dated Jan. 14, 2015 cited in Application No. 201110430658.2, 10 pgs.
U.S. Office Action dated Jan. 15, 2015 cited in U.S. Appl. No. 12/964,633, 20 pgs.

\* cited by examiner

ONLINE DATABASE AVAILABILITY DURING UPGRADE

CROSS-REFERENCED APPLICATIONS

This application is a continuation of and claims priority under 35 U.S.C. §120 to application Ser. No. 12/908,703, filed Oct. 20, 2010, entitled ONLINE DATABASE AVAILABILITY DURING UPGRADE, indicated to be issued as U.S. Pat. No. 8,417,737, on Apr. 9, 2013, which is hereby incorporated by reference in its entirety.

BACKGROUND

Web-based online services include files that are located on web servers along with data that is stored in databases. For example, there are a large number of servers located within different networks to handle the traffic that is directed to the service. Upgrades of databases that are associated with an application may result in the database being unavailable for a period of time. For some services the upgrade process may result in a significant disruption to the customers of the service.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An online service includes databases that are upgraded while still processing requests. For example, web servers continue to request operations on the database while it is being upgraded. The schema of the database is upgraded before the web servers are upgraded to utilize the upgraded schema. Changes that are made to the upgraded schema are backwards compatible with the schema being used during the upgrade process. Restrictions are placed on the operations performed on the database during the upgrade process. After upgrading the schema, the web servers of the online service are upgraded to use the upgraded schema.

DETAILED DESCRIPTION

Figure 1:
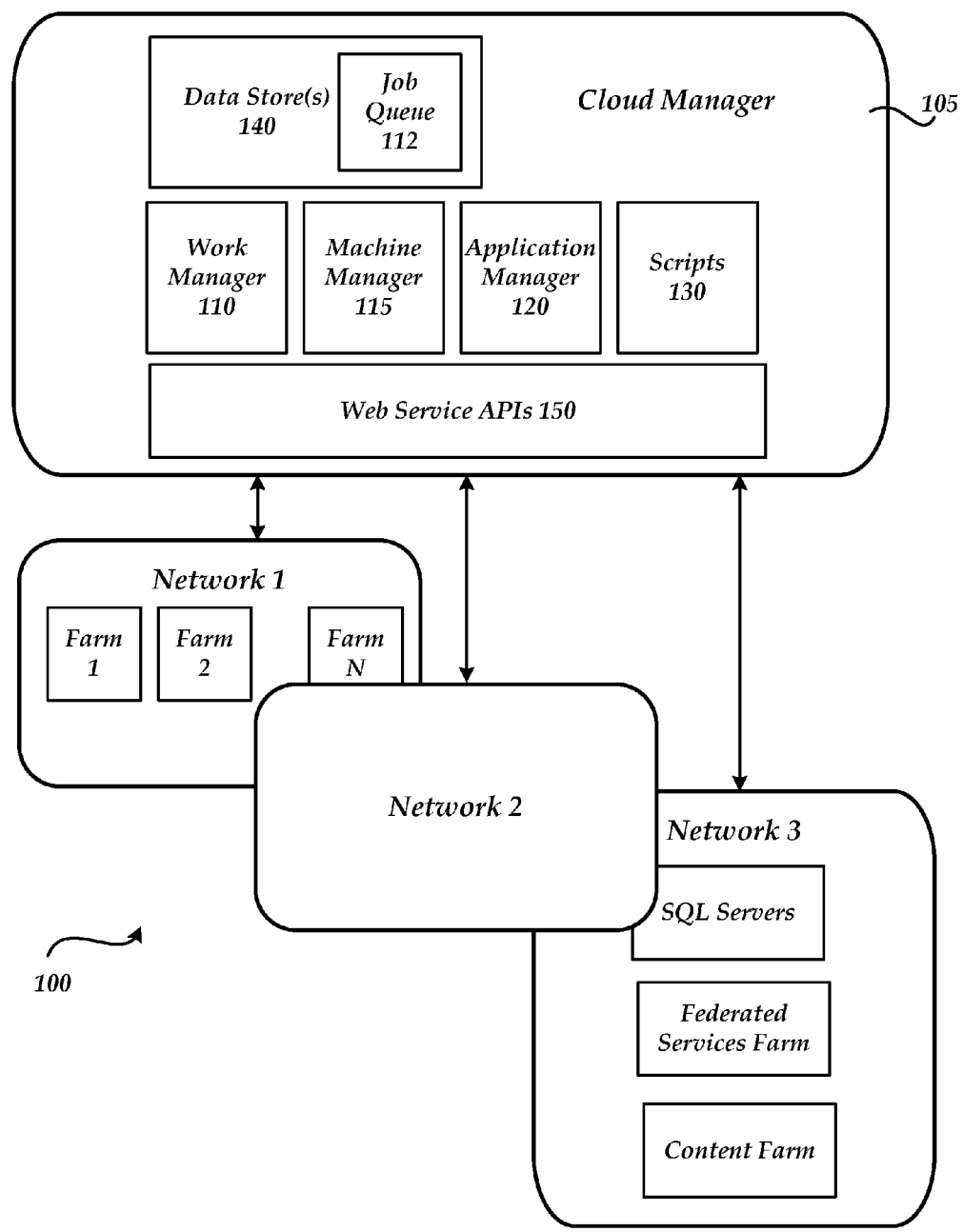
FIG. 1 illustrates a cloud manager system for managing networks that are associated with an online service, such as a content management service.

Referring now to the drawings, in which like numerals represent like elements, various embodiment will be described.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

FIG. 1 illustrates a cloud management system for managing networks that are associated with an online service. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Work manager 110 manages the execution of tasks and enables scheduling and retry of longer running tasks. Work manager 110 starts jobs stored in job queue 112 and keeps track of running jobs. When a predetermined time has elapsed, work manager 110 may automatically cancel the task and perform some further processing relating to the task. According to one embodiment, the tasks in job queue 112 are executed by work manager 110 by invoking one or more scripts 130. For example, a scripting language such as Microsoft's PowerShell® may be used to program the tasks that are executed by work manager 110. Each script may be run as a new process. While executing each script as a new process may have a fairly high CPU overhead, this system is scalable and helps to ensure a clean environment for each script execution plus full cleanup when the script is completed.

Machine manager 115 is configured to manage the physical machines in the networks (e.g. Network 1, Network 2, Network 3). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 3. In response to a request to cloud manager 105, machine manager 115 locates a suitable Physical Machine that is located on Network 3 and configures the VM according to the VM Image associated with the VM's Role. The physical machine is configured with a VHD of type Foo with version 12.34.56.78 that is stored within a data store, such as data store 140. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2, Network 3) may be stored locally to that network. The scripts may be used for many different purposes. For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the tasks that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. Generally, a network may continue to grow as long as the networking limits (e.g. load balancer and network switches) are not exceeded. For example, a network may start out with ten servers and later expand to one hundred or more servers. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 is designed to do very little processing (<10 ms, <50 ms) before returning a response to any given request. Cloud manager 105 maintains records to keep track of current requests. For example, cloud manager 105 updates records in a local database and if necessary schedules a "job" to perform more lengthy activity later.

Cloud manager keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

Figure 2:
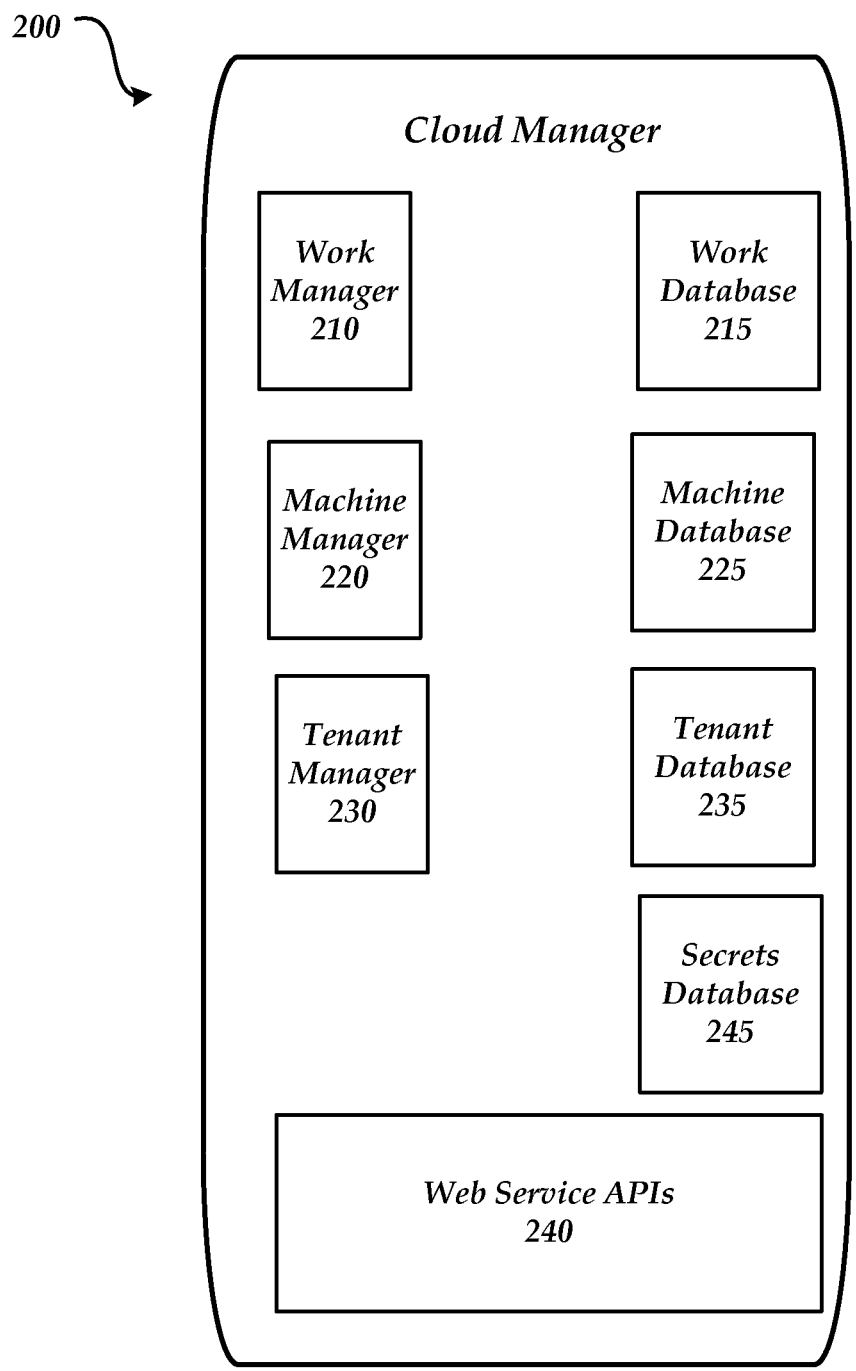
FIG. 2 shows a cloud manager including managers and associated databases.

FIG. 2 shows a cloud manager including managers and associated databases. As illustrated, cloud manager 200 comprises work manager 210, work database 215, machine manager 220, machine database 225, tenant manager 230, tenant database 235, secrets database 245 and web service APIs 240.

Generally, databases used within a cloud management system (e.g. system 100) are sized to enable high performance. For example, a database (such as work database 215, machine database 225, tenant database 235 and secrets database 245) may not exceed a predefined size limit (e.g. 30 GB, 50 GB, 100 GB, and the like). According to an embodiment, a database is sized such that it is small enough to fit in-memory of a physical machine. This assists in high read I/O performance. The size of the database may also be selected based on performance with an application program, such as interactions with a SQL server. The databases used in the farms may also be sized to enable high performance. For example, they may be sized to fit in-memory of the host machine and/or sized such that backup operations, move operations, copy operations, restore operations are generally performed within a predetermined period of time.

Cloud manager 200 divides the cloud manager data into four databases. The work database 215 for the work manager. The machine database 225 for the machine manager 220. The tenant database 235 for the tenant manager 230 and a secrets database 245 for storing sensitive information such as system account and password information, credentials, certificates, and the like. The databases may be on the same server and or split across servers. According to an embodiment, each database is mirrored for high availability and is a SQL database.

Cloud manager 200 is configured to interact with the databases using a reduced set of SQL features in order to assist in providing availability of the cloud manager 200 during upgrades of the databases. For example, foreign keys or stored procedures are attempted to be avoided. Foreign keys can make schema changes difficult and cause unanticipated failure conditions. Stored procedures place more of the application in the database itself.

Communications with the SQL servers are attempted to be minimized since roundtrips can be expensive compared to the cost of the underlying operation. For example, it is usually much more efficient if all of the current SQL server interactions to a single database are wrapped in a single round-trip.

Constraints are rarely used within the databases (215, 225, 235). Generally, constraints are useful when it helps provide simple updates with the right kind of error handing without extra queries. For example, the fully qualified domain name (FQDN) table has a constraint placed on the "name" to assist in preventing a tenant from accidentally trying to claim the same FQDN as is already allocated to a different tenant.

Caution is used when adding indices. Indices typically improve read performance at the cost of extra I/Os for write operations. Since the data within the databases is primarily RAM resident, even full table scans are relatively fast. According to an embodiment, indices may be added once the query patterns have stabilized and a performance improvement may be determined by proposed indices. According to an embodiment, if adding the index will potentially take a long time the "ONLINE=ON" option may be specified such that the table isn't locked while the index is initially built.

According to an embodiment, upgrades to databases within the cloud manager may be performed without causing downtime to the cloud manager system. In other words, even during an upgrade of the cloud manager, the cloud manager continues processing received requests. As such, changes made to the schema are to be compatible with the previous schema. The SQL schema upgrade is run before the web servers used by the cloud manager are upgraded. When the web servers are upgraded they can start to use the new features enabled in the database. Database upgrades are limited such that operations involved in the upgrade are quick and efficient. For example, tables may be added and new nullable columns may be added to existing columns. New columns may be added at the end of a table. Generally, time consuming operations to the databases are avoided. For example, adding a default value to a newly added column at creation time may be a very time consuming operation when there is a large amount of data. Adding a nullable column, however, is a very quick operation. As discussed above, adding new indices are allowed, but caution should be taken when adding a new constraint to help ensure sure that the schema upgrade won't break with the existing data. For example, when a constraint is added it may be set to a state that is not checked and avoids a costly validation of existing rows and potential errors. Old tables and unused columns are removed after a new version is being used and the cloud manager is not accessing those tables and columns.

Generally, a single row in each of the databases is used to indicate a task and/or a desired state. For example, the tenant database 235 includes a single row for each tenant. A given tenant may include a Required Version record. This record is used to help ensure that the tenant is placed on a farm running the required version. For example, for tenant 1 to stay on SharePoint 14 SP1, the required version for tenant could be set to "14.1." and any version including 14.1 would match and any other versions (e.g. 14.2.xxxx) would not match. The tenant records may include other items such as authorized number of users, quotas (e.g. allowed total data usage, per user data usage, etc.), time restrictions, and the like. Some organization might have multiple tenants that represent different geographies, organizations or capabilities. According to an embodiment, tenants are walled off from each other without explicit invitation of the users (via extranet or other features).

According to one embodiment, each tenant is locked into a specific network. Tenants are kept localized to a small set of databases. A tenant is either small (smaller than would fill one database) in which case it is in exactly one database, shared with other tenants. This implies that all the tenants sharing that database need to upgrade at the same time. When a tenant grows larger it may be moved to its own dedicated database(s) and now might have more than one, but is not sharing databases with other tenants. Maintaining a large tenant in one or more dedicated databases helps in reducing a number of databases that are needed to be upgraded simultaneously in a single upgrade.

Similarly, the work database 215 includes a single row for each job. The machine database 225 may include a row for each physical machine, VM, farm, and the like. For example, machine manager database 225 may include a version string.

According to an embodiment, each VHD, Farm, and VM within a network has an associated version string.

According to one embodiment, the cloud manager includes a simple logging system that may be configured to record a log entry for each web service call. A logging system may be implemented that includes as few/many features as desired. Generally, the logging system is used for measuring usage and performance profiling.

According to an embodiment, the Web Service APIs 240 are built using SOAP with ASP.net. The various Web Methods in the APIs follow two main patterns—Gets and Updates. Generally, the update methods take a data structure as the input and return the same structure as the output. The output structure returns the current state of the underlying object in the database, potentially differing from the input object if validation or other business logic changed some properties or else with additional properties filled in (for example record IDs or other values calculated by the cloud manager). The update methods are used for initial object creation as well as subsequent updates. In other words, callers to the web service APIs 240 can simply request the configuration they want and they don't need to keep track of whether the object already exists or not. In addition this means that updates are idempotent in that the same update call can be made twice with the identical effect to making it only once. According to an embodiment, an update method may include a LastUpdated property. When the LastUpdated property is present, the cloud manager 200 rejects the Update if the value of LastUpdate does not match the one currently stored in the database. Some Update methods include properties that are set on the first invocation of the method and are not set on other invocations of the method.

Cloud manager 200 is configured to avoid the use of callbacks. Since callbacks may be unreliable, clients interacting with cloud manager 200 may check object status using a web service API when they want to check a status of an update. According to an embodiment, a call to an update method causes cloud manager 200 to set the state of the underlying object to "Provisioning" and when the updates are completed the state is set to "Active".

Figure 3:
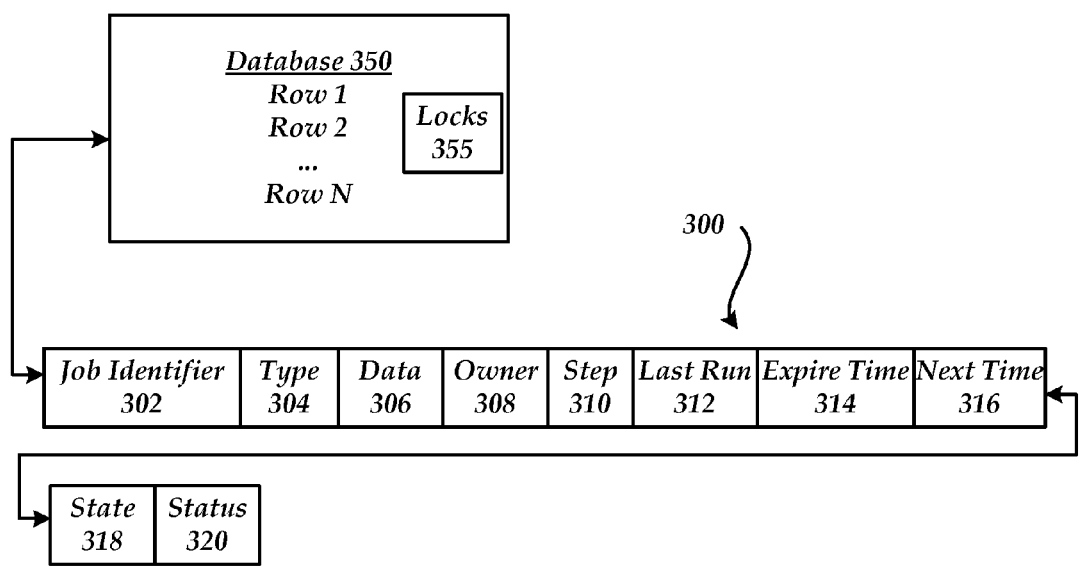
FIG. 3 shows an exemplary job record stored within a row of a database.

FIG. 3 shows an exemplary job record stored within a row of a database. As illustrated, record 300 comprises job identifier 302, type 304, data 306, owner 308, step 310, last run 312, expire time 314, next time 316, state 318 and status 320.

Generally, for each task that is requested to be performed, the cloud manager creates a record in database 350 (e.g. work database 215 in FIG. 2).

Job identifier 302 is used to specify a unique identifier for the requested task.

Type 304 specifies the task to perform. For example, the type may include a name of the script to be executed. For example, when the task is to run the script named "DeployVM.ps1" then the data 306 may include the identifier (e.g. "-VMID 123"). This allows new task types to be added to the system without requiring any changes to compiled or other binary parts of the system.

Data 306 is used to store data that is associated with the task. For example, the data may be set to the tenant, machine, network, VM, etc. on which the task is to be performed. The data 306 may also store one or more values to which a value in a database is set. The process running the task may look to the job record to see what value the desired number of machines is set to. The script uses the value in the database to perform the operation.

Owner 308 specifies a process/machine that is executing the process. For example, when a cloud manager machine starts execution of a job, the machine updates the owner 308 portion of the record with an ID of the machine.

Step 310 provides an indication of a step of the current script. For example, the script may divide a task into any number of steps. As the process completes a step of the script, step 310 is updated. A process may also look at step 310 to determine what step to execute in the script and to avoid having to re-execute previously completed steps.

Last run 312 provides a time the script was last started. Each time a script is started, the last run time is updated.

Expire time 314 is a time that indicates when the process should be terminated. According to an embodiment, the expire time is a predetermined amount of time (e.g. five minutes, ten minutes . . . ) after the process is started. The expire time may be updated by a requesting process through the web service API.

Next time 316 is a time that indicates when a task should next be executed. For example, a process may be stopped after completion of a step and be instructed to wait until the specified next time 316 to resume processing.

State 318 indicates a current state and Status 320 indicates a status of a job (e.g. Created, Suspended, Resumed, Executing, Deleted).

Duplicate rows in the database can be removed before they are performed if they have the same task type and data values. For example, multiple requests may be made to perform the same task that are stored in multiple rows of the database.

A job can have one or more locks 355 associated with it. If locks are not available then a job will not be scheduled to run until the locks are available. The locks may be configured in many different ways. For example, the locks may be based on a mutex, a semaphore, and the like. Generally, a mutex prevents code from being executed concurrently by more than one thread and a semaphore restricts a number of simultaneous uses of a shared resource up to a maximum number. According to an embodiment, a lock is a character string that represents a resource. The resource may be any type of resource. For example, the lock may be a farm, a machine, a tenant, and the like. Generally, the locks are used to defer execution of one or more tasks. Each job may specify one or more locks that it needs before running. A job may release a lock at any time during its operation. When there is a lock, the job is not scheduled. A job needing more than one lock requests all locks required at once. For example, a job already in possession of a lock may not request additional locks. Such a scheme assists in preventing possible deadlock situations caused by circular lock dependencies amongst multiple jobs.

Figure 4:
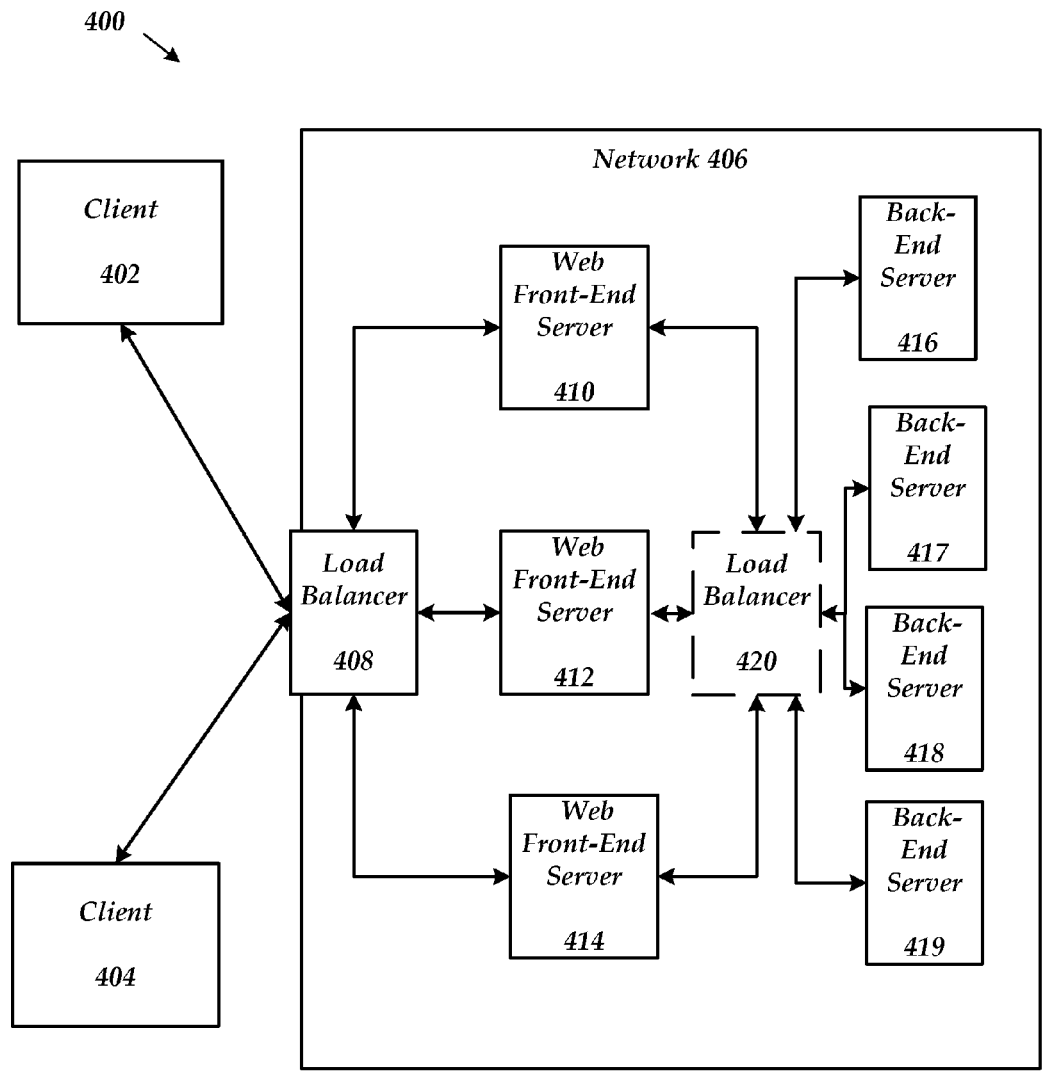
FIG. 4 shows an example system for a network including front-end and back-end servers for an online service.

FIG. 4 shows an example system 400 for a network including front-end and back-end servers for an online service. The example system 400 includes clients 402 and 404, network 406, load balancer 408, WFE servers 410, 412, 414 and back-end servers 416-419. Greater or fewer clients, WFEs, back-end servers, load balancers and networks can be used. Additionally, some of the functionality provided by the components in system 400 may be performed by other components. For example, some load balancing may be performed in the WFEs.

In example embodiments, clients 402 and 404 are computing devices, such as desktop computers, laptop computers, terminal computers, personal data assistants, or cellular telephone devices. Clients 402 and 404 can include input/output devices, a central processing unit ("CPU"), a data storage device, and a network device. In the present application, the terms client and client computer are used interchangeably.

WFEs 410, 412 and 414 are accessible to clients 402 and 404 via load balancer 408 through network 406. As discussed, the servers may be configured in farms. Back-end server 416 is accessible to WFEs 410, 412 and 414. Load balancer 408 is a dedicated network device and/or one or more server computers. Load balancer 408, 420, WFEs 410, 412 and 414 and back-end server 416 can include input/output devices, a central processing unit ("CPU"), a data storage device, and a network device. In example embodiments, network 406 is the Internet and clients 402 and 404 can access WFEs 410, 412 and 414 and resources connected to WFEs 410, 412 and 414 remotely.

In an example embodiment, system 400 is an online, browser-based document collaboration system. An example of an online, browser-based document collaboration system is Microsoft Sharepoint® from Microsoft Corporation of Redmond, Wash. In system 400, one or more of the back-end servers 416-419 are SQL servers, for example SQL Server from Microsoft Corporation of Redmond, Wash.

WFEs 410, 412 and 414 provide an interface between clients 402 and 404 and back-end servers 416-419. The load balancers 408, 420 direct requests from clients 402 and 404 to WFEs 410, 412 and 414 and from WFEs to back-end servers 416-419. The load balancer 408 uses factors such as WFE utilization, the number of connections to a WFE and overall WFE performance to determine which WFE server receives a client request. Similarly, the load balancer 420 uses factors such as back-end server utilization, the number of connections to a server and overall performance to determine which back-end server receives a request.

An example of a client request may be to access a document stored on one of the back-end servers, to edit a document stored on a back-end server (e.g. 416-419) or to store a document on back-end server. When load balancer 408 receives a client request over network 406, load balancer 408 determines which one of WFE server 410, 412 and 414 receives the client request. Similarly, load balancer 420 determines which one of the back-end servers 416-419 receive a request from the WFE servers. The back-end servers may be configured to store data for one or more tenants (i.e. customer).

Figure 5:
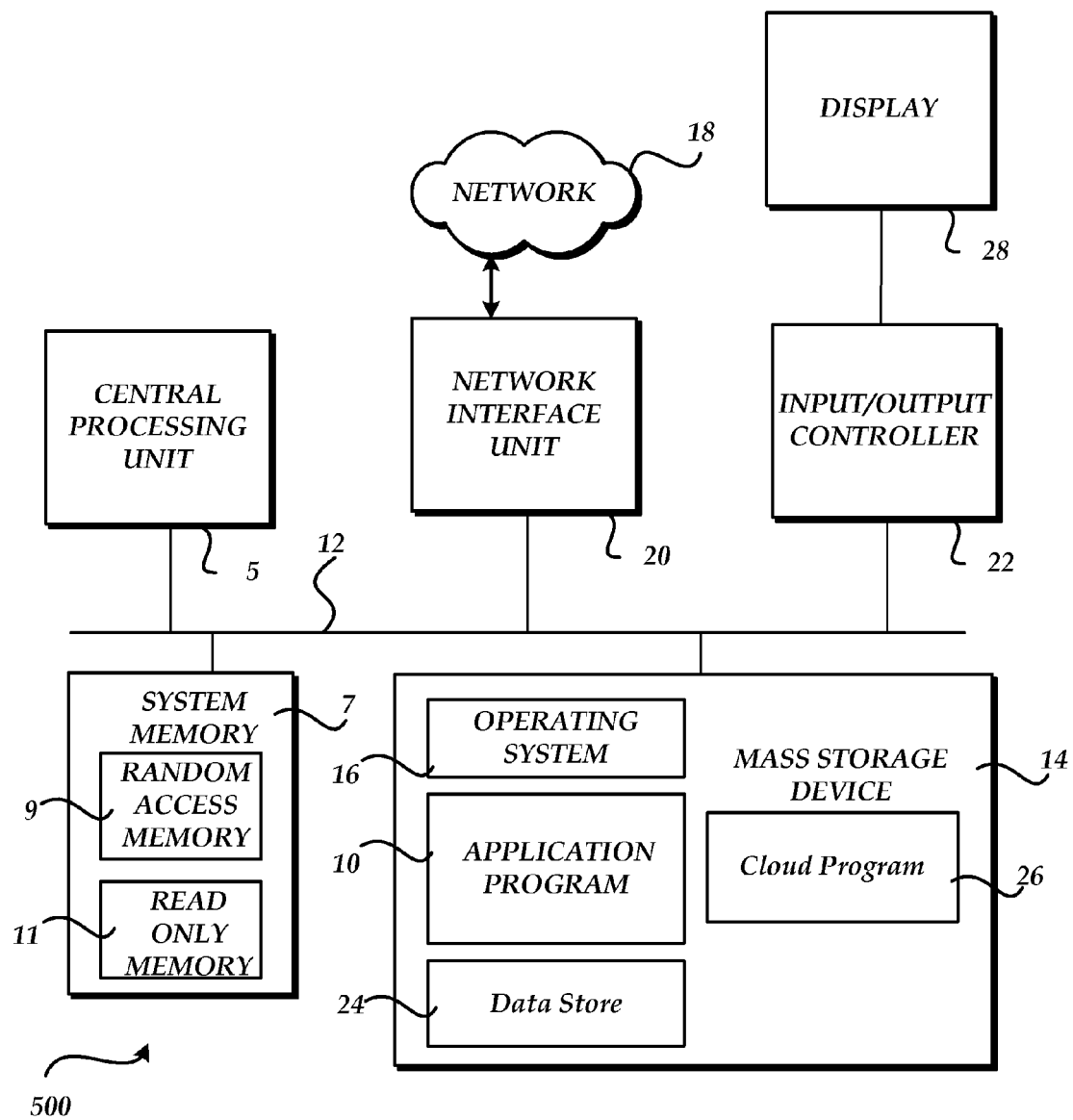
FIG. 5 illustrates a computer architecture for a computer.

Referring now to FIG. 5, an illustrative computer architecture for a computer 500 utilized in the various embodiments will be described. The computer architecture shown in FIG. 5 may be configured as a server, a desktop or mobile computer and includes a central processing unit 5 ("CPU"), a system memory 7, including a random access memory 9 ("RAM") and a read-only memory ("ROM") 11, and a system bus 12 that couples the memory to the central processing unit ("CPU") 5.

A basic input/output system containing the basic routines that help to transfer information between elements within the computer, such as during startup, is stored in the ROM 11. The computer 500 further includes a mass storage device 14 for storing an operating system 16, application programs 10, data store 24, files, and a cloud program 26 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments, computer 500 may operate in a networked environment using logical connections to remote computers through a network 18, such as the Internet. The computer 500 may connect to the network 18 through a network interface unit 20 connected to the bus 12. The network connection may be wireless and/or wired. The network interface unit 20 may also be utilized to connect to other types of networks and remote computer systems. The computer 500 may also include an input/output controller 22 for receiving and processing input from a number of other devices, including a keyboard, mouse, or electronic stylus (not shown in FIG. 5). Similarly, an input/output controller 22 may provide output to a display screen 28, a printer, or other type of output device.

As mentioned briefly above, a number of program modules and data files may be stored in the mass storage device 14 and RAM 9 of the computer 500, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 26, that perform tasks relating to the cloud system.

Figure 6:
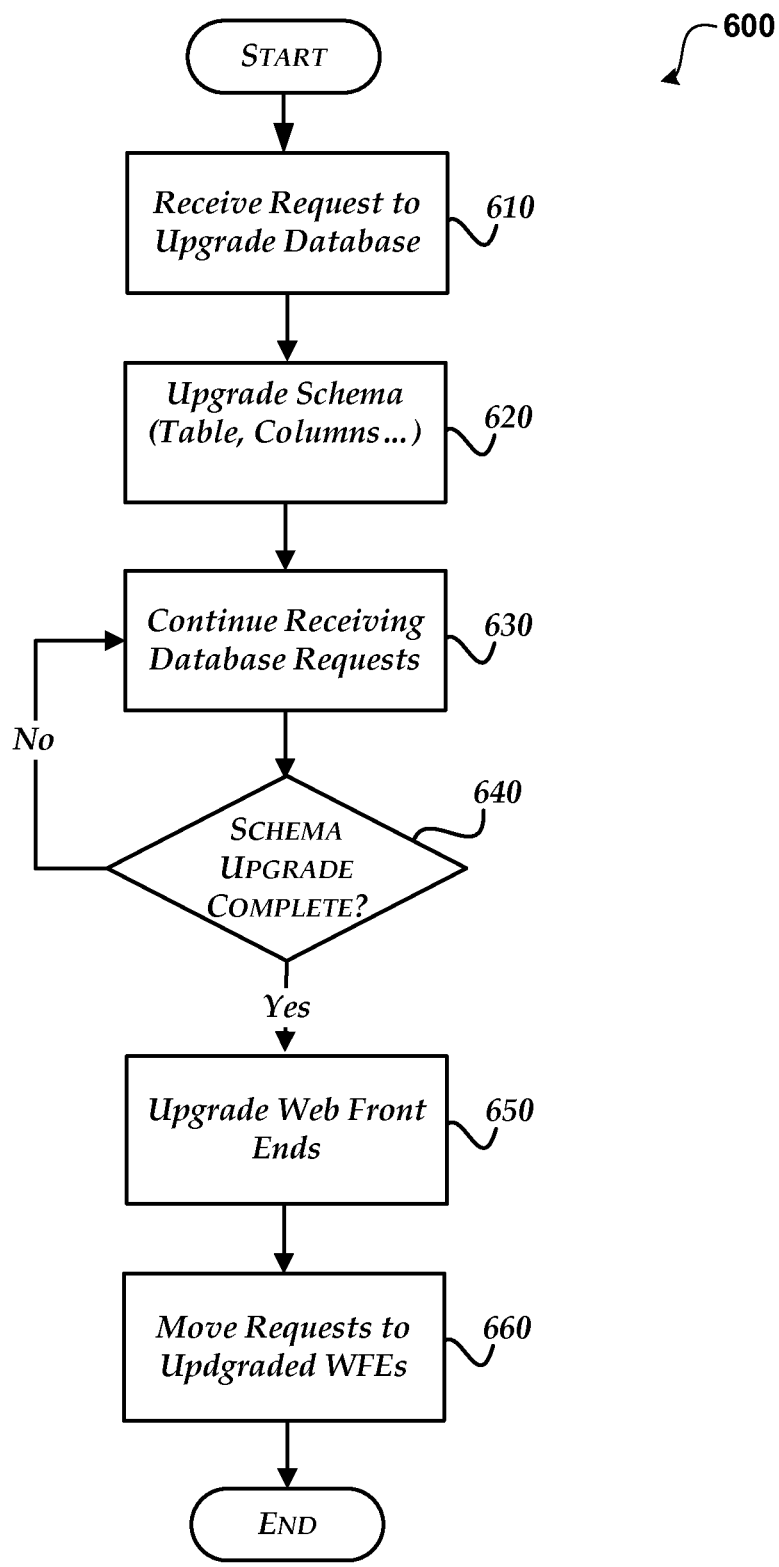
FIGS. 6-7 show a process for upgrading a database for an online service while still processing requests.
Figure 7:
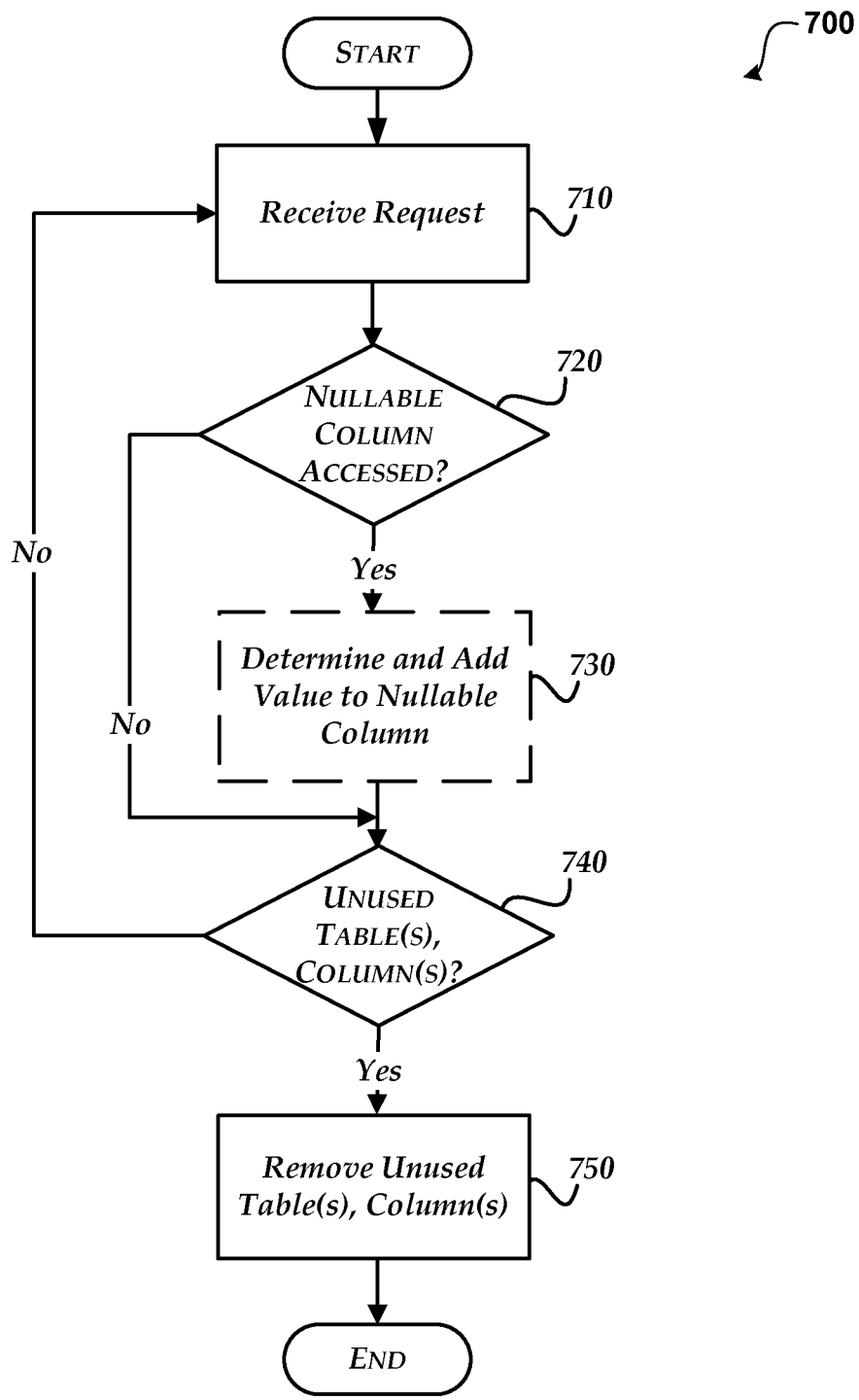

Referring now to FIGS. 6-7, processes for upgrading a database with an online service will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring now to FIG. 6, after a start operation, the process 600 flows to operation 610, were a request to upgrade a database is received. The request may be received through many different sources. For example, the request may be received through an API, such as a Web Service API, a command line interface, a graphical user interface, and the like.

Moving to operation 620, the schema that is associated with the database is upgraded. According to an embodiment, upgrades made to the schema are compatible with the schema currently being used by the cloud system. Generally, upgrades to the schema should attempt to avoid operations that are timely to process. For example, write operations to the database often are very time consuming, whereas read operations are generally much faster to perform.

According to an embodiment, upgrades to databases within the cloud manager may be performed without causing downtime to the cloud management system. In other words, even during an upgrade of a database used by the cloud manager, the cloud manager continues receiving requests and performing operations read and write operations on the database that is being upgraded. Generally, the SQL queries from the cloud manager are written such that schema changes will not impact them.

The cloud manager system (e.g. system 100) is configured to interact with the cloud manager databases using a reduced set of SQL features in order to assist in providing availability of the cloud manager during upgrades of the databases. For example, foreign keys or stored procedures are attempted to be avoided. Foreign keys can make schema changes difficult and cause unanticipated failure conditions. Stored procedures place more of the application in the database itself. As discussed above, constraints are rarely used within the databases.

Moving to operation 620, the schema for the database is upgraded. The SQL schema upgrade is performed before the web front-ends (WFEs) on the web servers used by the cloud manager are upgraded. Generally, when upgrades are applied to the schema, the underlying data in the database should remain unaffected such that the WFEs that don't have the new functionality to support the upgraded schema continue to function properly.

The upgrades to the database schema may include adding one or more columns, tables, indices, and the like. Generally, the database upgrades are limited such that operations that interact with the database during the upgrade are quick and efficient. For example, new tables may be added and new nullable columns may be added at the end to an existing table. The time consuming operations to the databases are avoided. For example, adding a new column that requires the entry of a value at creation time of the column may be a very time consuming operation when there is a large amount of data. Many tables may have a large number of rows. For example, adding a new column to a SharePoint tenants table may have millions of rows. Having to populate each of those rows in the column with a value could cause a significant performance hit on the database as the database writes would have to hit every page to enter a value. Adding a nullable column to an existing table, however, does not need to touch every page of the database. Instead, adding a nullable column that does not require an initial value is an operation that can be performed very quickly that is generally true irrespective of the size of the table. When the schema include new indices, they should be added such that the index is computed in the background after it is added and not make it available until the background processing of the index is complete. Constraints should be added with no check such that access to the database is allowed during the upgrade.

Moving to operation 630, the database being upgraded continues to receive requests for database operations from the WFEs. The operation of the cloud manager system during the upgrade process behaves as if no upgrade is being performed.

Flowing to decision block 640, a determination is made as to whether the schema upgrade is complete. When the upgrade is not complete, the upgrade process continues and the system continues to receive and process received requests. When the upgrade is complete, the process moves to operation 650, where the web servers including the WFEs used for interacting with the database are upgraded to include the new functionality of the upgraded schema. The upgrade of the WFEs may be performed using different methods. For example, the new WFE software may be installed on the same web server and/or placed on a different web server.

Transitioning to operation 660, the incoming requests are moved to the upgraded WFEs. The activation of the new WFEs may take place in serial and/or in parallel. For example, a portion of the WFEs may be made available at one point in time and another portion at another point in time. According to an embodiment, ASP.net functionality is used that allows a parameter to be set to direct the requests to the upgraded software.

Following the transitioning operation 660, incoming requests to new WFEs may uncover previously undiscovered errors with the upgraded software. In this situation, a remedy is to downgrade to the previous software version operating with the upgraded schema. In one embodiment, the WFEs are quickly downgraded to the previous software version in-place while operating against the upgraded schema.

The process then moves to an end block and returns to processing other actions.

FIG. 7 shows updating data within the database after schema upgrade has been completed.

After a start operation, the process 700 flows to operation 710 where a request to a database is received. Generally, the request comes from one of the WFEs on a web server and may be any type of request relating to a database (e.g. reads, writes, searches, etc. . . . ). According to an embodiment, read operations include the explicit columns that are to be read from. In this way, even when a schema changes, the explicit columns within the data remain the same.

Moving to decision operation 720, a determination is made as to whether data has been read from the database that includes a nullable column that does not have a specified value. When a nullable column has not been accessed, the process moves to decision operation 740. When a nullable column has been accessed, the process flows to operation 730.

At operation 730, a value for the nullable column may be determined For example, a default value may be chosen or the value for the nullable column may be determined from some other action (i.e. performing a calculation, look up, etc.). In this way, the values for the nullable columns may be updated over time, rather than in a single time-consuming operation when they are created. When a column is accessed it may be checked to determine if the value is null and when the value is null it may be replaced with a default value if there is not already a specified value. The specific code pattern to check for Null & optionally replace with a default value if there is not already a specified value. The following is an example code snippet:

```
if (!Reader.IsDBNull(5))
{
        this.State = Reader.GetString(5);
}
else
{
    this.State = DefaultState.Active;
}
```

After the object is written with the determined value, the null value is gone.

Moving to decision operation 740, a determination is made as to whether there are any unused tables/columns that should be cleaned up. This determination may occur after a predetermined period of time in which the upgraded schema has been running and/or by some other input (e.g. received command). According to an embodiment, unused tables and columns are removed after the upgraded schema is being used and the cloud manager is not accessing those tables and columns. When a table or column is not to be removed, the process returns to operation 710. When a table or column is to be removed, the process moves to operation 750.

At operation 750, the unused table(s) and/or column(s) are removed.

The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for upgrading a database that is still being accessed in an online service, comprising:
    starting an upgrade process of a database used in the online service that includes updating a schema that is used by the database;
    upgrading the schema of the database currently being utilized to an upgraded schema while continuing to receive, process, and perform requests for database operations; and
    receiving, by the database, a request from an upgraded computing device using the upgraded schema.

2. The method of claim 1, wherein upgrading the schema of the database comprises adding a nullable column to an end of a table.

3. The method of claim 2, further comprising adding a value to the nullable column when a subsequent request to the database accesses data comprising the nullable column.

4. The method of claim 1, wherein upgrading the schema of the database comprises adding a table.

5. The method of claim 1, wherein upgrading the schema of the database comprises adding an index during the upgrade process and calculating the index after the upgrade process is complete.

6. The method of claim 1, further comprising after the upgrade process of the database schema is complete and the upgraded computing device is accessing the database using the upgraded schema, automatically determining when to remove unused tables and columns from the database.

7. The method of claim 1, further comprising upgrading a computing device of the online service to use the upgraded schema, wherein upgrading the computing device of the online service comprises upgrading software on the computing device such that requests to the database continue to be fulfilled during the upgrading of the software on the computing device.

8. The method of claim 7, wherein upgrading the computing device of the online service further comprises activating a set of web servers that use the upgraded schema and directing requests to the new set of web servers.

9. The method of claim 1, wherein the online service is a document collaboration service, and the database is a tenant database is maintained that includes a single row for each tenant.

10. A computer-readable storage medium, excluding signals, having computer-executable instructions for upgrading a database currently in use in an online service, comprising:
    starting an upgrade process of a database used in the online service;
    upgrading a schema of the database currently being utilized to an upgraded schema while continuing to receive, process, and perform requests for database operations; wherein the upgraded schema is backwards compatible with the schema; and
    receiving, by the database, a request from one or more upgraded computing devices utilizing the upgraded schema.

11. The computer-readable storage medium of claim 10, wherein upgrading the schema of the database comprises adding a nullable column to an end of a table and after the upgrade process has completed adding a value to the nullable column when a subsequent request to the database accesses data comprising the nullable column.

12. The computer-readable storage medium of claim 10, further comprising restricting write operations to the database that relate to the upgrade process of the schema when the schema of the database is being upgraded.

13. The computer-readable storage medium of claim 10, wherein the database is a tenant database is maintained that includes a single row for each tenant.

14. The computer-readable storage medium of claim 10, wherein upgrading the schema of the database comprises adding an index during the upgrade process and setting an option such that a table associated with the index remains unlocked when the index is initially built.

15. The computer-readable storage medium of claim 10, further comprising after the upgrade process of the database schema is complete automatically determining when to remove unused tables and columns from the database.

16. The computer-readable storage medium of claim 10, further comprising activating a set of web servers that use the upgraded schema and directing requests to the new set of web servers.

17. A system for upgrading a database currently in use in an online service, comprising:
    a processor and a computer-readable storage medium;
    an operating environment stored on the computer-readable medium and executing on the processor; and
    an upgrade manager operative to:
        start an upgrade process of the database; wherein the database continues to receive, process and perform requests from web servers associated with the online service for database operations during the upgrade process;
        upgrade the schema of the database currently being utilized to an upgraded schema;
    receiving, by the database, a request from an upgraded web server utilizing the upgraded schema.

18. The system of claim 17, wherein upgrading the schema of the database comprises adding a nullable column to a table and after the upgrade process has completed adding a value to the nullable column when a subsequent request to the database accesses data comprising the nullable column and a check of the nullable column determines that a value of the nullable column is null.

19. The system of claim 17, further comprising restricting write operations to the database that relate to the upgrade process of the schema when the schema of the database is being upgraded.

20. The system of claim 17, further comprising upgrading the web servers to use the upgraded schema of the online service, wherein upgrading the web servers comprises continuing to fulfill requests to the database during the upgrading of the software on the web servers and activating a set of web servers that use the upgraded schema and directing requests to the new set of web servers.

* * * * *